United States Patent [19]
Cerveny

[11] 3,746,984
[45] July 17, 1973

[54] AUTOPOLARITY VOLTMETER CIRCUIT
[75] Inventor: Walter J. Cerveny, Lima, Ohio
[73] Assignee: Triplett Corporation, Bluffton, Ohio
[22] Filed: Sept. 8, 1970
[21] Appl. No.: 70,369

[52] U.S. Cl. .................. 324/115, 324/119, 324/133
[51] Int. Cl. ....................... G01r 15/08, G01r 19/14
[58] Field of Search .................... 324/115, 119, 111, 324/98, 123, 133, 76

[56] References Cited
UNITED STATES PATENTS

| | | | |
|---|---|---|---|
| 2,364,687 | 12/1944 | Banker | 324/119 |
| 2,764,737 | 9/1956 | Parke | 324/119 X |
| 2,939,067 | 5/1960 | Wouk | 324/119 X |
| 2,944,215 | 7/1960 | Corson | 324/119 X |
| 3,398,369 | 8/1968 | Pallatz | 324/119 |
| 3,421,982 | 1/1969 | Schultz et al. | 324/119 |
| 1,254,620 | 1/1918 | Newman | 324/111 |
| 3,211,995 | 10/1965 | Wise et al. | 324/119 X |
| 2,870,408 | 1/1959 | Draganjac | 324/115 |
| 1,689,660 | 10/1928 | Albrecht | 324/98 |
| 3,311,826 | 3/1967 | Galman | 324/123 |

Primary Examiner—Rudolph V. Rolinec
Assistant Examiner—Ernest F. Karlsen
Attorney—Fay, Sharpe and Mulholland

[57] ABSTRACT

A highly-sensitive circuit for an electrical instrument for causing the indicator on a meter to read linearly upscale for positive or negative DC signals, AC signals, or a combination of AC or DC signals applied to the input of the circuit. The input signal to be measured is provided to an input circuit which includes a resistive divider network in circuit with a null control circuit for selecting the range of input signals. A selected proportion of the input signal is applied to the input of a field effect transistor (FET). The output from the FET is applied to the input of a transistor having its output in circuit with a bridge network. The bridge network includes a pair of oppositely poled diodes in circuit with fixed resistors so that a first diode conducts for positive signals and a second diode conducts for negative signals from the transistor. A meter is connected in circuit with the diodes and is arranged so that the indicator on a meter reads upscale whether the output of the amplifier comprises positive or negative DC signals or AC signals or a combination of both. A feedback circuit includes a resistive network in circuit with the bridge for selecting the appropriate circuit sensitivity for the function to be performed by the circuit. The output from the resistive network in the feedback path is connected to a pair of transistors connected in a Darlington configuration, the output of which is connected to the FET. The input circuit also includes a switching circuit for providing a coupling capacitor in series circuit with the input signals to block DC when AC signals are being measured, and to provide a low pass filter in circuit with the input signals when DC signals are being measured. The circuit according to the invention may be also be used to measure resistance and current.

The method of using the circuit of the invention is also disclosed wherein the indicator on the meter is caused to indicate a null reading in the absence of an input signal to the circuit by adjusting the null control circuit and sensing the indicator on the meter until a null is reached. The null control circuit may also be used to provide a storage feature for the circuit.

19 Claims, 1 Drawing Figure

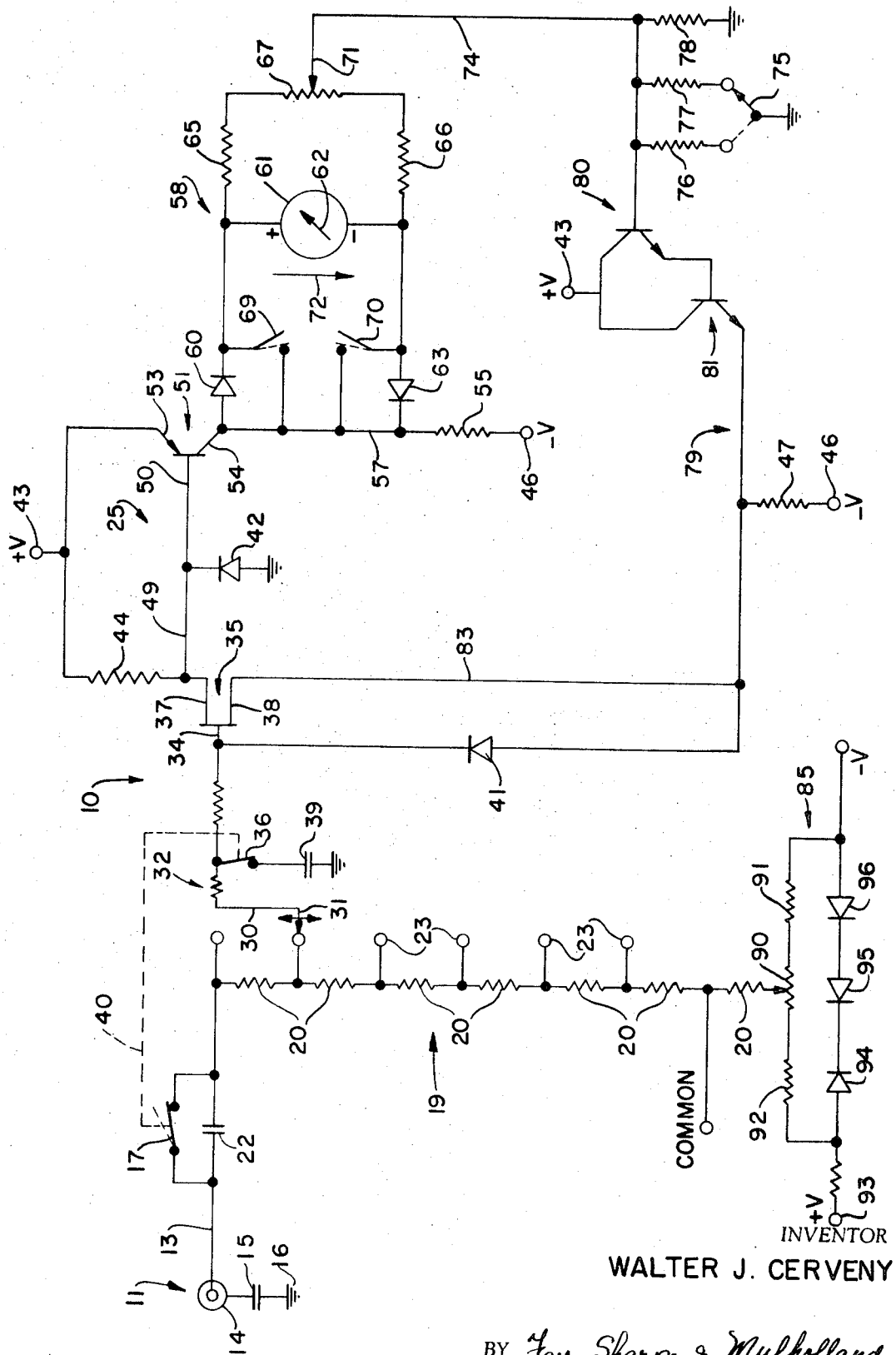

AUTOPOLARITY VOLTMETER CIRCUIT

BACKGROUND OF THE INVENTION

This invention relates to a circuit for an electrical instrument in which the indicator on a meter reads upscale for positive or negative DC input signals, AC input signals or a combination of both. More particularly, this invention relates to a circuit for use in a multimeter which is capable of measuring positive or negative DC signals, AC signals, and other circuit parameters with a common circuit. Still more particularly, this invention relates to a method of using the circuit according to the invention in which the indicator for the meter of the circuit is caused provide a null or a minimum indication rather than an apparent zero setting and wherein this feature may also be used to provide a signal storage capability for the meter.

In the electrical arts, the need for producing an instrument which provides a measuring device for a number of circuit parameters, such as AC voltage, DC voltage, AC current, DC current, resistance and the like has long been known. The prior art has thus provided a number of circuits which provide the capability of measuring most or all of these parameters in a single instrument. Conventional multimeters, however, generally require that great care be used and specific attention be given to the polarity of the signal being measured. In using such conventional instruments, the application of the input leads of the multimeter to the test point in the circuit at the wrong polarity causes the meter to read offscale in a reverse direction and requires that the input leads be reversed to correct for their erroneous application to the test point. Such manipulations are extremely time consuming, especially in troubleshooting a complex circuit, and are annoying to the person using the instrument.

Accordingly, it is an aim of the invention to provide a multimeter in which the indicator on the meter reads upscale regardless of the polarity of the test point to which the input leads for the meter are attached. Such a circuit thus eliminates the need to switch leads during troubleshooting in the event that the input leads for the instrument are connected to the test point in a reverse manner. Such a feature also has a particular advantage when troubleshooting in confined or crowded quarters where the test point may be difficult to reach. In addition, such a feature saves the user valuable time in testing the circuit.

It is also desired in the development of multimeters to minimize the number of circuit components for use with the instrument so that such instrument may be small, lightweight, and simple to manipulate. Thus, it is an additional aim of this invention to provide an autopolarity voltmeter circuit in which the same amplifier circuit may be used for all of the functions of the voltmeter, including the measurement of both AC voltage, DC voltage, current and other parameters as well. Such common circuitry results in a lower cost for the instrument and has substantial advantages in decreasing circuit complexity.

In addition, in the development of such voltmeters, it is desired that a number of specific features be provided so that the instrument provides an accurate indication of the input signal to be measured. For example, it is generally desired that the input impedance for the circuit of the instrument be quite high for instrument accuracy. Moreover, it is desired that the amplifier circuit of the instrument incorporate a high degree of feedback so that the tracking of the input signal by the indicator on the meter is linear over the scale selected. It is also desired to minimize the number of scales used on the instrument for its current and voltage ranges, while yet preserving the accuracy of the instrument over a wide range. The use of a minimum number of selectable scales consistent with the accuracy requirements for the instrument provides another time-saving capability to the instrument for the user.

In addition, it is known that the resistance of the metal, generally copper, used in the moving coil of the meter changes with temperature. Thus, it is desired in developing meters of the type described to compensate automatically, preferably through the use of a feedback circuit, for changes in the impedance of the metal in the meter. When so compensated, the instrument may be used over a wide temperature range without the loss of accuracy and this feature provides another significant capability for the instrument.

The prior art has also produced a number of meters which use various techniques for adjusting the zero setting for the indicator on the meter. Such techniques often include the laborious and time-consuming feature of adjusting a variable resistor in circuit with the meter until a precise zero setting on the meter is obtained. In such instruments, that setting is essential for an accurate indication of the signals being measured by the meter over the instrument range. In general, care must be taken in making such adjustments to avoid parallax of the pointer with respect to the scale on the meter face to avoid inaccuracy of the output reading on the meter. Thus, it is desired to provide a meter which provides an accurate indication of the input signal without the need for adjusting the instrument precisely to zero, but rather to some other easily observable point, such as a minimum deflection of the indicator on the meter over a range of adjustments, or for a null reading. If an operator were able to adjust for a null, for example, substantial time savings would be achieved in the use of a meter.

It is also a problem in the development of multimeters to provide a memory or storage capability for the instrument. For example, it is sometimes convenient to sense a circuit parameter and to observe the magnitude of the sensed parameter at a later time without having had to record the indication or trust to memory recall.

By further example, there are a number of situations in which repetitive samplings of a circuit parameter, such as the voltage across a battery, are made. In making such measurements, it is an advantage to the operator to be able to read the variance of the parameter from an optimum level directly, without the need for mentally observing the output on the meter, and subtracting the observed output from a known optimum output. Thus, it is an additional aim of the invention to provide a multimeter which will directly read the variance of the circuit parameter from an optimum level. In addition, it is thus an advantage of such an instrument to be able to retain the indication of the observed signal on the instrument after the input probe for the meter had been removed from the signal. Thus, it is an additional aim of this invention to provide a circuit which has a storage feature in which the indication on the meter of the instrument is adjusted for a predetermined setting and wherein the circuit operates so that when the probe is removed from the parameter, the indicator will return to the original reading observed and maintain that reading for later reference by the operator.

Finally, it is a continuing object in the art of producing multimeters to make such instruments solid state instruments which operate with the use of batteries to avoid the need for circuit connections to external power sources. It is an additional object in the development of such meters to provide a low current drain from the battery power sources so that the instrument has a long life without the need for maintenance or replacement of the storage batteries. Accordingly, it is an additional aim in such instruments to minimize the battery drain to avoid problems of maintenance and deterioration in the accuracy of the instrument with age.

These and additional aims and objects of the invention will become apparent from a review of the written description of the invention taken in conjunction with the accompanying drawings.

BRIEF SUMMARY OF THE INVENTION

Directed to overcoming the shortcomings of the prior art and achieving the aims and objects aforestated, the circuit according to the invention includes a probe which is capable of connection to a test point for providing a source of input signals to the circuit. Input circuit means are provided for receiving the input signal from the probe and applying an input signal representative thereof to the gate of a field effect transistor (FET). The input circuit includes a divider network comprising a plurality of selectable resistors for accommodating a wide range of input signals applied to the FET. A filter circuit, including a switch, selectively provides a coupling and DC blocking capacitor in circuit with the input circuit when the instrument is used to indicate an AC signal or to provide a low pass filter in circuit with DC signals to eliminate AC components in the signal. The resistive divider is connected in circuit with a zero null control circuit for adjusting an indicator on the output meter for a null or a minimum setting. The divider and zero null control circuit are so arranged that a minimum reading occurs when a predetermined point on the resistive bridge is adjusted to a zero voltage. A signal limiting diode is connected in circuit with the gate of the FET to avoid damaging the circuit.

The output of the FET is connected in circuit with a transistor amplifier having its output in circuit with a bridge network which includes the output meter. The bridge network comprises a pair of oppositely poled diodes, each of which is in circuit with a resistor. A variable resistor is connected in circuit with these resistors so that each leg of the bridge comprises a diode in circuit with a resistor and a selected portion of the variable resistor. The output meter is connected between the cathode of a first diode and the anode of a second diode. The anode of the first diode and the cathode of the second diode are connected to a common terminal in circuit with the output of the transistor. The circuit thus operates so that if a positive signal is applied to the diode bridge, the first diode conducts while if the applied voltage is negative, the second diode conducts. In this manner, the current flow through the meter is unidirectional regardless of the polarity of the signal applied to the input of the meter.

A feedback circuit comprises a selective function resistor in circuit with a pair of transistors connected in a Darlington configuration which are, in turn, connected to the source element of the FET. By such a feedback connection, the closed loop gain is maintained at a low value while the open loop gain is maintained at a high value resulting in high gain stability and linearity in the circuit. The feedback circuit also significantly increases the input resistance of the FET, while effectively ignoring changes in the function resistance.

The method of using such a circuit includes the step of adjusting the zero setting of the circuit according to the invention by adjusting the zero null control circuit. The zero null control is set so that the meter indication achieves a null, rather than necessarily an absolute zero setting, in the absence of an input signal to the circuit. The method of using the circuit also includes the step of storing the magnitude of an output signal produced in response to an input signal to the circuit by adjusting the zero null control.

BRIEF DESCRIPTION OF THE DRAWINGS

In the drawings:

The single FIGURE is a detailed circuit diagram, partially in block form, illustrating the circuit according to the invention.

DETAILED DESCRIPTION OF THE PREFERRED EMBODIMENT

The multimeter circuit according to the invention is designated generally by the reference numeral 10 and includes a probe 11 which is capable of being connected to a test point in a circuit for providing a source of input signals on lead 13. The probe 11 has its external jack 14 connected by a capacitor 15 to a source of reference potential 16, for example, ground. Throughout this specification, the terms "source of reference potential", "ground", or "common" are used interchangably.

The signals on lead 13 are connected through a switch 17 to a resistive divider network designated generally by the reference numeral 19, which comprises a plurality of resistors 20. A capacitor 22 is connected in parallel to the switch 17. As shown, the switch 17 is connected so that the circuit may receive either AC or DC signals. If the switch 17 is opened, the capacitor 22 is inserted in circuit with the signals on lead 13 and acts as a blocking capacitor to remove DC components from the AC signals. Physically, the manipulative portion of the switch 17 is located on the face of the meter and is marked with indicia for the convenience of the operator.

The resistive divider network 19 provides a range selection for the circuit so that the input signals may be connected with any one of a plurality of taps 23 to provide the source of input signals to the amplifier circuit designated generally by the reference numeral 25.

The input signals from the selected tap 23 on the resistive divider network 19 are provided on lead 30 to the switch 31. When in the position shown, the circuit is designed to receive DC signals through a resistor 32 which is connected to the gate 34 of a field effect transistor 35. The field effect transistor includes a drain electrode 37 and a source electrode 38.

When DC signals are provided on lead 13 and switch 17 is closed, as previously described, a switch 36 is also closed and the signals are applied directly to the resistor 32 and to the gate electrode 34 of the FET 35. Preferably, the switch 17 and the switch 36 are ganged for simultaneous operation as shown by the dotted line 40.

In this case, the capacitor 39 acts in conjunction with the resistor 32 as a filter to remove any AC signals that may be superimposed on the DC voltage being measured.

On the other hand, when AC signals are provided on lead 13, the switches 17 and 36 are opened. Thus, the capacitor 22 acts as a coupling capacitor for the AC signals and a blocking capacitor to the DC components of the AC signals when the switch 17 is open. When desired, a combination of DC and AC signals may be measured by maintaining switches 17 and 36 in the position shown.

A diode 41 has its cathode connected to the gate 34 of the field effect transistor 35 and together with the resistor 32 provides an overload protection to the input of the FET 35. Similarly, a diode 42 in circuit with the drain 37 of the FET and with the base 50 of the transistor 51 acts as a current limiter for the circuit.

A source of positive biasing potential 43 is connected to the drain 37 of the input field effect transistor through a biasing resistor 44. The source 38 of the FET 35 is connected to a negative source of biasing potential 46 through a resistor 47. The output from a field effect transistor 35 is connected by way of lead 49 to the base 50 of an amplifying transistor 51. The emitter 53 of the transistor 51 is directly connected to the source of biasing potential 43, while its collector is connected through a biasing resistor 55 to the source of negative potential 46. Thus, the voltage applied to the gate 34 of the field effect transistor 35 is amplified both by the field effect transistor 35 and by the PNP transistor 51.

The output from the collector 54 of the transistor 51 is provided to a bridge network 58. The bridge 58 comprises a first diode 60 having its anode connected to the collector 54 of the transistor 51 and to lead 57 and its cathode connected to the positive terminal of a meter 61. A second diode 63 has its cathode connected to the lead 57 and its anode connected to the negative terminal of the meter 61. The cathode of the diode 60 is also connected to a fixed resistor 65, while the anode of the diode 63 is connected to a fixed resistor 66. The opposite ends of the resistors 65 and 66 are connected to a variable resistor 67 which is adjustable to achieve a DC balance, and to bias the meter 61 for accuracy.

A switch 69 is connected in parallel with the diode 60 while a switch 70 is connected in parallel with the diode 63. The switches 69 and 70 are provided so that, when either switch is closed, the circuit may operate to measure positive or negative DC signals, respectively, in a conventional manner. In operation, however, with the switches 69 and 70 as shown, positive signals from the collector 54 of the transistor 51 on lead 57 will cause diode 60 to conduct to provide a current flow from plus to minus through the meter 61 in the direction designated by the arrow 72. When negative signals appear on lead 57 from the collector 54 of transistor 51, the diode 63 is caused to conduct and current flow is again in the direction designated by the arrow 72. Thus, there is a unidirectional current flow through the meter 61 regardless of the polarity of the applied signal.

The meter 61 has an indicator, or pointer 62, for providing a physical representation of the magnitude of the signal applied to the meter. Similarly, when AC signals appear on lead 57, diodes 60 and 63 conduct on alternate positive and negative half cycles in the manner previously described so that the current flow on alternate positive and negative half cycles through the meter 61 is likewise in the same direction.

The switches 69 and 70 also provide a capability for the circuit to indicate what polarity is being measured. If a positive signal is applied to the bridge 58 and provides an upscale reading on the meter 61 and the positive measuring switch 69 is depressed, the meter reading remains the same since the diode 60 had previously been conducting in response to the positive signals. If, on the other hand, the switch 70 is depressed while positive signals are applied to the bridge 58, the meter indication falls to below zero since the diode 63 had not previously been conducting. Thus, in effect, the potential across a diagonal of the bridge 58 is determined by the voltage drop across the diode 60 when switch 70 is closed for positive signals appearing on lead 57.

On the other hand, if a negative potential is applied to the bridge 58, the diode 63 is conducting and the depression of the negative polarity determining switch 70 causes no change in the output reading on the meter 61. Under these conditions, the diode 60 is non-conductive so that the depression of the switch 69 will cause the meter to read below scale as determined by the voltage differences across the meter, i.e., the voltage drop across the diode 63.

The signal across the meter 61 under either condition is also applied across the series combinations of resistors 65, 66 and 67. Since the resistor 67 is adjustable, the proportion of the signal provided on either leg of the bridge may be selected in accordance with the desired balance of the circuit. The variable tap 71 of the potentiometer 67 is applied on lead 74 to a function switch designated generally at 75. The function switch comprises a plurality of resistors, three representative resistors being shown as designated by numerals 76, 77 and 78 to provide a variable quantity of resistance in shunt with the feedback network designated generally at 79 to the circuit. The function switch is physically operated when the function of the multimeter is selected. Thus, for accuracy, a different amount of resistance may have to be inserted in the feedback path for the measurement of resistance than, for example, for the measurement of current by the meter.

The feedback network 79 comprises a pair of transistors 80 and 81 connected in a Darlington configuration, i.e., the emitter of the transistor 80 is connected to the base of the transistor 81 while their collectors are respectively connected to the source of biasing potential 43. The emitter of the transistor 81 is connected to the biasing resistor 47 and thus to the source 38 of the FET 35 by way of lead 83.

A proportion of the signal which appears on lead 74 is fed back to the Darlington pair of transistors 80 and 81 to the source element 38 of the transistor 35. The amount of signal fed back is determined by the resistance ratio of the bridge resistor 67 and the function resistor 75, respectively. In a preferred embodiment, a typical value of the closed loop gain of the circuit was about 4, whereas the open loop gain was at about 400, thus affording a feedback of greater than 100 to 1 which thus resulted in good gain stability and linearity in the meter output. The use of the feedback network 79 also increases the input resistance of the FET since the feedback signal is in phase with the input signal so that in effect, the source element is bootstrapped.

The high current gain of the Darlington pair of transistors 80 and 81 produces a very low drive impedance to the source element of the FET 35. Thus, changing the function resistance value of the function switch 75 has little effect on the reflected impedance of the Darlington pair since the gain of the circuit is high and therefore the impedance is relatively low. Thus, with a low source impedance, the gain of the field effect transistor 35 will be high for all values of the function resistors 76, 77 or 78.

A significant advantage to the circuit is provided by use of the zero null control circuit 85 in circuit with the resistive divider network 19. When no input signals are applied to the circuit, the indicator on the meter 61 can be set to zero by adjusting the zero null control 85. While in a conventional multimeter, the adjustment is set so that the meter achieves a true zero setting, the adjustment of the zero null control 85 according to the invention permits the adjustment of the circuit so that the meter achieves a null or a minimum rather than a true zero. The minimum reading occurs when the top of the resistive bridge, i.e., signal on lead 57, is adjusted to a zero voltage.

The null control circuit 85 includes a source 93 of reference potential, i.e., a battery 93. A plurality of diodes 94, 95 and 96, for regulating the battery potential, are connected in series with each other, and the series combination of diodes is connected in parallel with the battery 93.

A variable resistor 90 has its wiper connected to one of the resistors 20 in the resistive network 19. Resistors 91 and 92 are respectively connected to the opposite ends of the variable resistor 90, and the series combination of resistors 90, 91 and 92 are connected in parallel with the battery 93.

Adjustment of the variable resistor 90 permits the signal level applied to the lowermost resistor 20 of the network 19 to be varied, thus effectively controlling the shunting action of the network 19 on the input signal applied to the base of the FET 35. Accordingly, the positioning of the indicator 62 on the meter 61 may be controlled by this technique.

The parameters of the circuit are selected so that the indicator 62 on the meter 61 achieves a null reading when a predetermined signal, for example, zero volts, is applied to a predetermined point, i.e., the lead 57 in the bridge network 58. In a preferred embodiment, when no input signal is applied to the circuit on lead 13, the signal level at lead 57 is set by the adjustment of the resistor 90 to zero volts by adjusting the resistor 90 until the indicator 62 on the meter 61 achieves a null indication. The capability of the circuit to be adjusted to a zero setting by adjusting to the null indication on the meter is a significant time-saving feature of the circuit.

The adjustment of the null control circuit 85 when an input signal is applied to the circuit on lead 13 provides a storage capability for the circuit. By way of example, a signal applied to lead 13 from the probe 11 will cause the indicator 62 on the meter 61 to achieve a certain setting which indicates the magnitude of the signal. While the signal continues to be applied, the variable resistor 90 in the null control circuit 85 is adjusted until the indicator 62 is caused to achieve a zero or a null setting. Thereafter, when the input signal on lead 13 is removed, the indicator will return to the position which it had attained when the signal was previously applied. In this manner, the magnitude of the signal is effectively stored by the meter for later use by the operator.

One manner in which the stored signal may be effectively used by the operator is during the repetitive sensing of signals, for example, the voltage on DC batteries. When a subsequent signal is applied to the circuit, the indicator 62 will indicate the difference between the stored signal, i.e., the signal sensed when the prior signal was sensed, and the subsequent signal. In this manner, the circuit may be used to indicate directly the difference between an applied signal and a predetermined signal.

If desired, the predetermined level may be set by the operator to a predetermined value by an adjustment of the variable potentiometer 90 without applying an input signal to lead 13. In this manner, the difference between the subsequently applied signal and an optimum level is immediately indicated by the meter.

These additional capabilities for the circuit of the invention provide still additional savings of time for the user and significant convenient advantages. Thus, a versatile, easy-to-use circuit for an electrical instrument and the method of using such circuit has been described.

The invention has been described in detail sufficient to enable one of ordinary skill and in the art to make and use the same. Obviously, modifications and alterations of the preferred embodiment will occur to others upon a reading and understanding of the specification; and, it is my intention to include all such modifications and alterations as part of my invention insofar as they come within the scope of the appended claims.

What is claimed is:

1. A high input impedance circuit for an electrical instrument capable of receiving an input signal which is either positive or negative with respect to a datum signal level and providing a unidirectional physical representation thereof for either polarity comprising:

input means for receiving said input signal indicative of a sensed parameter to be measured;

means for amplifying said input signal to provide an output signal which is a representation of said sensed parameter;

output means, comprising a meter which includes means for providing said unidirectional physical representation of the magnitude of a signal applied to said meter irrespective of the polarity of the applied signal, for receiving said output signal from said amplifying means and applying said output signal to said meter in such a manner that said physical representation is unidirectional with respect to a datum signal level for output signals which are either positive or negative or a combination thereof with respect to a second datum signal level; and means for indicating whether said input signal is positive or negative with respect to said datum signal level by altering the magnitude of the physical representation on said meter.

2. The circuit as defined in claim 1 wherein said input means includes a device for sensing a parameter to be measured and providing an output signal indicative thereof.

3. The circuit as defined in claim 1 wherein said output means includes a first unidirectionally conductive device and a second unidirectionally conductive device, each of which is connected in circuit with said amplifying means for receiving said output signal and in circuit with said meter.

4. The circuit as defined in claim 3 wherein each of said unidirectionally conductive devices is a diode arranged so that one of said diodes conducts for an output signal having a first polarity and the other of said diodes conducts for an output signal of a second polarity.

5. The circuit as defined in claim 4 wherein said indicating means includes a first switch in circuit with said one diode and a second switch in circuit with said other diode for selectively shunting the output signal from said amplifying means across the diode with which the switch is associated, whereby closure of one of said first switch and said second switch without changing the representation on said meter indicates that said input signal is positive and the closure of the other switch indicates that said input signal is negative by changing the representation on said meter.

6. The circuit as defined in claim 5 wherein said output means further includes a balance resistor in circuit with each of said diodes.

7. The circuit as defined in claim 6 wherein the output means further includes means for selecting one of a plurality of resistances, each of which corresponds to a sensing function to be performed by the circuit.

8. The circuit as defined in claim 1 further including voltage feedback means in circuit with said output means and said amplifying means and said circuit is characterized as having an input impedance in the order of better than 10 megohms.

9. The circuit as defined in claim 8 wherein said feedback means includes selectively variable resistance means and feedback amplifier means in circuit therewith, said variable resistance means being in circuit with said output means and said feedback amplifier means is in circuit with said variable resistance means and said amplifying means.

10. The circuit as defined in claim 9 wherein said feedback amplifier means includes a pair of transistors connected in a Darlington configuration to couple the output means to the input means.

11. The circuit as defined in claim 10 wherein said amplifying means includes a field effect transistor having a gate, a source, and a drain, the gate of said field effect transistor being connected in circuit with said input signal and the source of said field effect transistor being connected in circuit with the output of one of said pair of Darlington-connected transistors.

12. The circuit as defined in claim 1 further including means for varying the said physical representation of said meter so that said physical representation is set at a predetermined position for a predetermined condition.

13. The circuit as defined in claim 12 wherein said predetermined condition is the absence of an input signal to the circuit and said predetermined position is a null reading on said meter.

14. The circuit as defined in claim 12 wherein said predetermined condition is the absence of an input signal to the circuit and said predetermined position is a predetermined reading on said meter.

15. The circuit as defined in claim 12 wherein said predetermined condition is the presence of a first input signal to the circuit and said predetermined condition is a null reading on said meter.

16. In a circuit for an electrical instrument of the multimeter type which is capable of at least receiving an input signal which is either positive or negative with respect to a datum signal level and providing a unidirectional physical representation of the magnitude of said input signal irrespective of the polarity of said input signal and which includes a source of input signals, means for amplifying an input signal to provide an output signal, and a meter which includes an indicator, the improvement comprising autopolarity means for causing said indicator to read upscale for output signals having either positive or negative components or a combination thereof, said means comprising a bridge network which includes a pair of diodes, each of said diodes being in circuit with a resistance so that a diode and a resistance comprise each leg of the bridge network, said meter being connected between the respective junctions common to a diode and a resistance, said autopolarity means including means for indicating whether said input signal is positive or negative with respect to said datum signal level by altering the magnitude of the physical representation on said meter.

17. The circuit as defined in claim 16 wherein said bridge network includes a terminal for receiving said output signal, a first diode having its anode in circuit with said first terminal and its cathode in circuit with said meter, and a second diode having its cathode in circuit with said first terminal and its anode in circuit with said meter.

18. The circuit as defined in claim 17 further including a variable impedance in circuit with said first diode and said second diode through said resistances.

19. The circuit as defined in claim 1 wherein said input means includes:
- a capacitor for coupling said input signal to said amplifying means;
- a low pass filter for filtering AC components from said input signal; and
- switching means for selectively inserting either said capacitor or said low pass filter in circuit with said input signal when AC or DC signals respectively are being measured.

* * * * *